United States Patent
Bowler et al.

(10) Patent No.: US 11,951,858 B2
(45) Date of Patent: Apr. 9, 2024

(54) CHARGING DEVICE FOR CONNECTING AN ELECTRICAL ENERGY STORE OF A MOTOR VEHICLE TO A CHARGING STATION

(71) Applicant: Bayerische Motoren Werke Aktiengesellschaft, Munich (DE)

(72) Inventors: Melissa Bowler, Munich (DE); Mark Aaron Chan, Munich (DE); Markus Feigl, Munich (DE); Josef Poemmerl, Furth (DE); Martin Rau, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 446 days.

(21) Appl. No.: 17/288,066

(22) PCT Filed: Sep. 30, 2019

(86) PCT No.: PCT/EP2019/076357
§ 371 (c)(1),
(2) Date: Apr. 23, 2021

(87) PCT Pub. No.: WO2020/083608
PCT Pub. Date: Apr. 30, 2020

(65) Prior Publication Data
US 2021/0380006 A1    Dec. 9, 2021

(30) Foreign Application Priority Data
Oct. 26, 2018   (DE) .................. 10 2018 126 854.8

(51) Int. Cl.
*B60L 53/302*  (2019.01)
*B60L 53/16*  (2019.01)
(Continued)

(52) U.S. Cl.
CPC ............. *B60L 53/302* (2019.02); *B60L 53/16* (2019.02); *B60L 53/18* (2019.02); *H02J 7/0045* (2013.01)

(58) Field of Classification Search
None
See application file for complete search history.

(56) References Cited

U.S. PATENT DOCUMENTS 9,321,362 B2 *  4/2016  Woo .................... B60L 53/18
9,761,976 B2 *  9/2017  Mark ................... B60L 53/18
(Continued)

FOREIGN PATENT DOCUMENTS

CN    104334397 A    2/2015
CN    106104949 A    11/2016
(Continued)

OTHER PUBLICATIONS

German-language Search Report issued in German Application No. 10 2018 126 854.8 dated Jan. 24, 2022 with partial English translation (12 pages).

(Continued)

*Primary Examiner* — Leigh M Garbowski
(74) *Attorney, Agent, or Firm* — Crowell & Moring LLP

(57) ABSTRACT

A charging device for connecting an electrical energy store of a motor vehicle to a charging station for electrical energy includes a charging cable having at least one line for conducting a charging current and at least one connection element via which the charging cable is connectable to a corresponding connection element between the energy store and the charging station. At least one latent heat store is provided on the charging cable and/or on the at least one connection element and can be used to absorb heat generated during the charging process.

9 Claims, 2 Drawing Sheets

(51) Int. Cl.
  *B60L 53/18* (2019.01)
  *H02J 7/00* (2006.01)

(56) References Cited

U.S. PATENT DOCUMENTS

| | | | |
|---|---|---|---|
| 10,535,940 B2 * | 1/2020 | Fuehrer | ............... B60L 53/16 |
| 2015/0028811 A1 | 1/2015 | Krammer et al. | |
| 2015/0217654 A1 | 8/2015 | Woo et al. | |
| 2017/0028862 A1 | 2/2017 | Nagel et al. | |
| 2018/0277283 A1 * | 9/2018 | Remisch | ............... B60L 53/16 |
| 2018/0334775 A1 * | 11/2018 | Rolland | ............... H01B 7/292 |
| 2019/0020140 A1 | 1/2019 | Fuehrer et al. | |
| 2020/0303093 A1 | 9/2020 | Cantz et al. | |

FOREIGN PATENT DOCUMENTS

| | | |
|---|---|---|
| CN | 205810463 U | 12/2016 |
| CN | 106409420 A | 2/2017 |
| CN | 108701513 A | 10/2018 |
| DE | 10 2012 213 855 A1 | 2/2014 |
| DE | 10 2016 105 308 A1 | 9/2017 |
| DE | 10 2017 010 038 A1 | 4/2018 |
| DE | 10 2017 201 111 A1 | 7/2018 |
| WO | WO 2015/119791 A1 | 8/2015 |
| WO | WO 2017/079018 A1 | 5/2017 |

OTHER PUBLICATIONS

International Search Report (PCT/ISA/210) issued in PCT Application No. PCT/EP2019/076357 dated Dec. 12, 2019 with English translation (four (4) pages).
German-language Written Opinion (PCT/ISA/237) issued in PCT Application No. PCT/EP2019/076357 dated Dec. 12, 2019 (eight (8) pages).
Chinese-language Office Action issued in Chinese Application No. 201980067970.4 dated Apr. 25, 2023 with English translation (16 pages).
Chinese-language Office Action issued in Chinese Application No. 201980067970.4 dated Oct. 31, 2023 with English translation (14 pages).

* cited by examiner

CHARGING DEVICE FOR CONNECTING AN ELECTRICAL ENERGY STORE OF A MOTOR VEHICLE TO A CHARGING STATION

BACKGROUND AND SUMMARY OF THE INVENTION

The invention relates to a charging device for connecting an electrical energy store of a motor vehicle to a charging station for electrical energy.

Electrically driveable motor vehicles which are in the form of automobiles, in particular, generally have an energy store, in particular in the form of a traction battery, for storing electrical energy. The size of the energy store or of the battery determines the range of the motor vehicle. This, in addition to the charging time which is to be spent and is needed to fill the energy store with electrical energy, is an important factor in acceptance and in the transition to electro-mobility.

There are various approaches to improving the range, which is shorter in relation to a motor vehicle driven with an internal combustion engine, or making the long charging time particularly short. In this case, the charging time depends on the charging speed. If, for example, the electrical energy is provided by a charging station with particularly high power, the charging speed of the motor vehicle may depend on a maximum receiving capacity of the motor vehicle for the electrical energy. In this case, the substantially limiting factor is the heat which is produced by a flow of current and can arise, in particular, as a result of power loss at contact resistances, for example. If the heat produced heats up parts of components involved in the charging operation, for example, this can result in overheating, with the result that the charging speed must be reduced.

DE 10 2017 010 038 A1 thus discloses a charging device for inductively charging an energy store of a motor vehicle, having at least one charging coil for inductively transmitting electrical energy for charging the energy store, wherein the charging coil is embedded, at least in certain regions, in a material which can be used to absorb heat from the charging coil in order to passively cool the latter.

The object of the present invention is therefore to provide a charging device which can be used to charge an electrical energy store of a motor vehicle at a particularly high charging speed.

This object is achieved, according to the invention, by means of a charging device for connecting an electrical energy store of a motor vehicle to a charging station for electrical energy having the features of the independent patent claim. The dependent patent claims and the description relate to advantageous embodiments of the invention.

The invention relates to a charging device for connecting an electrical energy store of a motor vehicle, which is in the form of an automobile in particular, to a charging station, which is, in particular, in the form of a charging post of a charging infrastructure for example, for electrical energy. The charging device comprises a charging strand with at least one line, which may be formed from copper in particular, for conducting a charging current. The charging device according to the invention also comprises at least one connection element which can be used to connect the charging strand to a corresponding connection element between the electrical energy store and the charging station. The charging strand may be in the form of a charging cable, in particular, and the at least one line is a core of the cable, in particular. The connection element is, for example, a charging socket, with the result that the corresponding connection element is advantageously in the form of a connecting plug which fits into the charging socket. The motor vehicle is, in particular, an electrically operable motor vehicle having an electrical machine which can be supplied with energy by the electrical energy store which is in the form of a traction battery and/or a high-voltage store, in particular. The connection element is also referred to as a charging interface.

In order to be able to carry out a charging operation of the motor vehicle, during which electrical energy flows from the charging station to the electrical energy store of the motor vehicle by means of the charging current, at a particularly high charging speed, at least one latent heat store is provided according to the invention on the charging strand and/or on the at least one connection element and can be used to absorb heat produced during the charging operation. The latent heat store is designed to store heat supplied to it, in particular so-called latent heat. That is to say, the latent heat store can absorb thermal energy without itself changing its temperature in the process. This is generally carried out by virtue of the latent heat store comprising at least one phase change material which changes its aggregate state and/or another phase, in particular by means of a phase transition, while absorbing the supplied thermal energy. According to the invention, the at least one latent heat store is arranged on the charging strand and/or the connection element, which both each produce heat, in particular during the charging operation.

In other words, the latent heat store comprises a phase change material which can absorb the emitted heat in a particularly advantageous manner since the energy of the heat is used to change the aggregate state of the phase change material. However, this also additionally prevents excessive heating of the phase change material of the actual copper line or line, for example. In particular, depending on its volume or the volume of the latent heat store, the phase change material may absorb only a limited amount of heat on the basis of the energy to be absorbed, which heat can also be emitted or is emitted again after the completion of the charging operation, for example. In this case, the latent heat store in the charging device according to the invention can be dimensioned, for example, on the basis of the storage size or the storage capacity of the electrical energy store, wherein the storage capacity is dependent on the vehicle type of the motor vehicle, for example. The storage capacity of the energy store can be selected to be smaller in a compact vehicle than in a medium-sized vehicle or a luxury vehicle, for example. According to the invention, the latent heat store can therefore be dimensioned in such a manner that the high charging speed can be achieved in a particularly advantageous manner with particularly favorable use of material. A user of the motor vehicle can therefore charge his motor vehicle in a desired time which may be particularly short, in particular.

As a result of the fact that the latent heat store can absorb heat without itself changing its temperature, reaching of a limit temperature of at least one part involved in the charging operation, for example the connection element, is delayed during the charging operation, thus resulting in their advantage that the charging speed can be kept particularly high and the charging time can be kept particularly low. The charging device can therefore be passively cooled by the latent heat store.

For example, it is possible to use particularly high charging currents, as a result of which the charging time is particularly short since the power loss, in particular at a contact resistance which can occur between the connection elements and the corresponding connection element, can be kept particularly low. Since the respective limit temperature is only reached particularly late, early throttling of the power of the charging operation can be avoided.

In this case, the invention is based on the knowledge that, for example in a DC fast-charging device, the limit temperature is reached at a charging socket, which can be represented by the connection element, at approximately 90° Celsius, as a result of which the charging operation can last for approximately ten minutes longer. Therefore, the invention focuses on dissipating the resulting heat as quickly and as uniformly as possible from the respective part, that is to say the charging socket for example, and being able to pass it on to an environment, which is achieved by means of the charging device according to the invention, wherein, in particular in one embodiment, the charging strand and the connection element are arranged between the charging station and the motor vehicle.

In one advantageous configuration of the invention, the charging strand and the connection element are components of the motor vehicle. That is to say, the charging device is integrated in the motor vehicle. In this case, the charging strand, for example, connects the electrical energy store to a connection element which is in the form of a charging socket, in particular, and is arranged, for example, on an outer shell of the motor vehicle. This results in the advantage that the charging device is carried as part of the motor vehicle independently of the charging station, with the result that virtually any desired charging station can provide a particularly advantageous charging speed for the charging device according to the invention, for example by means of a software update.

In a further advantageous configuration of the invention, the charging strand and the connection element are components of the charging station. In other words, the charging device is part of the charging station, and so the charging strand is, for example, in the form of a charging cable of the charging station that has, at one end, the connection element in the form of a charging plug which is in the form of a type-2 plug, for example, and can be inserted into a corresponding charging socket of a motor vehicle. This results in the advantage that the charging device which is designed for passive cooling is available for any electric vehicle which is intended to be charged by the charging station.

In a further advantageous configuration of the invention, the line is at least partially surrounded by insulation, on the side of which facing away from the line the latent heat store is arranged in at least one section. In other words, the line or core is formed by the insulation as a type of cable, wherein the latent heat store is arranged on the outer side of the insulation, that is to say on the outside of the cable, at least in one section. In this case, the insulation is preferably formed from a rubber, in particular from a silicone rubber, which has particularly good insulation properties with, for example, a particularly high degree of flexibility of the line or of the charging strand, in particular in the form of a cable. The line or core of the charging strand is preferably a copper cable, for example, and the insulation which sheathes the copper cable or the copper core conducts the heat produced by the charging operation to the latent heat store, with the result that the energy released by the heat is stored in the latter and the reaching of the limit temperature of the charging strand or of at least one connection element adjoining the latter can therefore be delayed. This makes it possible to achieve a high charging speed and therefore a fast-charging concept in a particularly advantageous manner.

In a further advantageous configuration of the invention, the section surrounds the line on the outer circumference side in at least one direction and extends along the direction of longitudinal extent of the charging strand. In this case, the extent along the direction of longitudinal extent may be short or long. In the case of a line of the charging strand having a substantially round cross section, the result is, for example, a substantially annular section if the length along the direction of longitudinal extent or the extent along the direction of longitudinal extent is short. If the extent along the direction of longitudinal extent is long, the latent heat store is arranged in a substantially tube-like manner around the line. As a result of at least one section of the line being surrounded by the latent heat store, there is particularly efficient heating or the temperature is kept constant by the latent heat store at least in that section. If the latent heat store is designed such that it extends furthest over the entire length of the direction of longitudinal extent, a large part of the charging strand can be cooled in a particularly advantageous manner. In contrast, if a plurality of sections which are annular are formed, particularly simple production and/or a particularly high degree of flexibility of the charging strand can be achieved by stringing together the ring elements, for example.

In a further advantageous configuration of the invention, the section is interrupted by at least one separating wall which may also be formed, in particular, from the material of the insulation of the line. In this case, if the line has a substantially round cross section, the at least one separating wall may be formed radially to the outside, for example, with the result that individual chambers can be implemented on the outer circumference side along the line, for example by means of the separating wall, which chambers, as latent heat stores, can each be filled with the phase change material. Mechanical stability at least of the charging strand of the charging device can be achieved in a particularly advantageous manner, for example, by means of the at least one separating wall in the section which interrupts the latent heat store, for example.

In a further advantageous configuration of the invention, the section which comprises the latent heat store runs helically around the at least one line. That is to say, the latent heat store is wound around the at least one line in a helical manner, as a result of which the latent heat store can be formed in a particularly simple manner, for example, in which case a particularly large part of the line can be simultaneously provided with a latent heat store.

For the mentioned embodiments of the section along the line, it holds true that, if the charging strand contains only one line, it is respectively arranged individually around one line. In contrast, if the charging strand comprises a plurality of lines, the respectively mentioned embodiment or a combination thereof may be respectively embodied around an individual line or may be combined around a plurality of lines in any desired combinations, thus resulting in a particularly flexible configuration of the charging strand.

In a further advantageous configuration of the invention, the connection element is in the form of a charging socket or a charging plug. In this case, the corresponding connection element is in the form of a charging plug, for example a type 2 plug, in the first case and is in the form of a charging socket in the second case, wherein the latter can be situated, for example, on the motor vehicle or on the charging post, in particular. The design as a charging socket and a charging plug makes it possible to achieve a connection between the charging device and the motor vehicle or between the charging device and the charging station or between the motor vehicle and the charging station in a particularly simple and advantageous manner by means of the charging device.

In a further advantageous configuration of the invention, the latent heat store is arranged on at least one contact element of the connection element. In other words, the latent heat store is connected, in particular thermally connected, to the contact element of the connection element, wherein, if the connection element is a charging plug for example, the contact element may be a contact pin of the charging plug. If the connection element is in the form of a charging socket for example, the contact element is, for example, the corresponding receiving socket for the contact plug or contact pin. Placing or arranging the latent heat store on a contact element of the connection element makes it possible to absorb an amount of heat in a particularly advantageous manner, in particular at one of the points at which the greatest production of heat can be expected on account of the contact resistance, with the result that one of the most thermally loaded regions of the charging device can be temperature-controlled or held at a temperature by means of the passive "cooling".

In a further advantageous configuration of the invention, the latent heat store comprises at least one phase change material which has paraffin and/or carbon. The phase change material of the latent heat store is therefore at least partially formed from paraffin. Additionally or alternatively, the phase change material is at least partially formed from carbon. In this case, a temperature for the phase change, which stores or absorbs the latent heat, of approximately 55° Celsius can be achieved, for example, by means of the paraffin, which enables particularly advantageous use for the charging device. In addition, the combination of paraffin and carbon, which can therefore constitute a composite of a phase change material, enables particularly advantageous thermal conductivity, for example as a result of the included graphite, thus making it possible to achieve, for example, particularly good thermal contact between a component to be cooled, from the connection element and/or the charging strand, and the latent heat store.

Further features of the invention emerge from the claims, the figures and the description of the figures. The features and combinations of features mentioned in the description above and the features and combinations of features mentioned in the description of the figures below and/or shown solely in the figures can be used not only in the respectively stated combination, but also in other combinations or alone.

The invention is now explained in more detail on the basis of a preferred exemplary embodiment and with reference to the drawings.

DETAILED DESCRIPTION OF THE DRAWINGS

Figure 1:
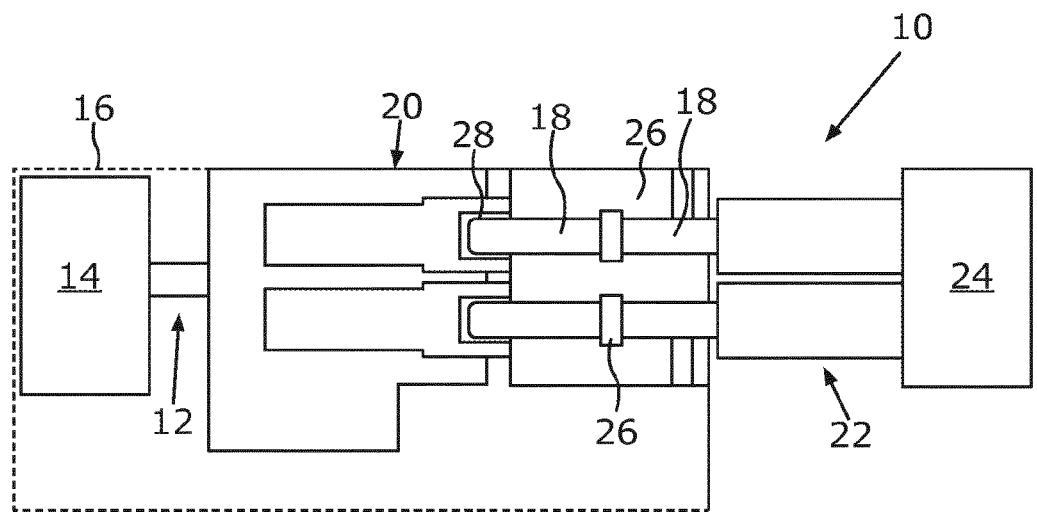
FIG. 1 is a schematic structure of a charging device for connecting an electrical energy store of a motor vehicle to a charging station, having a charging strand and a connection element.

FIG. 1 shows a schematic structure of a charging device 10 for connecting an electrical energy store 14 of a motor vehicle 16 to a charging station 24, having a charging strand 12 and a connection element 20. In this case, the charging strand 12 has at least one line 18 which is formed from copper, in particular, and represents a core of the charging strand 12 which is in the form of a charging cable, in particular. In this case, the line 18 is used to conduct a charging current. The charging device 10 also has at least one connection element 20 which can be used to connect the charging strand 12 to a corresponding connection element 22 between the energy store 14 and the charging station 24.

In order to be able to carry out a charging operation, in which electrical energy is stored in the electrical energy store 14 of the motor vehicle 16 by means of a charging current from the charging station 24, in a particularly fast manner, that is to say at a particularly high charging speed, at least one latent heat store 26 is provided on the charging strand 12 and/or on the at least one connection element 20 and can be used to absorb heat produced during the charging operation.

In this case, the charging strand 12 and the connection element 20 are advantageously components of the motor vehicle 16 and so the connection element 20, for example, is advantageously in the form of a charging socket, in particular of the motor vehicle 16, as can be seen in FIG. 1.

In another configuration of the invention, the charging strand 12 and the connection element 20 may each also be a component of the charging station 24. Alternatively, the charging device 10 is neither a component of the motor vehicle 16 nor a component of the charging station 24, but rather is independent and is used for the connection between the motor vehicle 16 and the charging station 24. In this case, the motor vehicle 16 is advantageously an electrically driven automobile and the charging station 24 may be advantageously in the form of a charging post of the charging infrastructure element, for example, or may also be in the form of a conventional socket in the simple case.

The at least one latent heat store 26 comprises at least one phase change material which comprises paraffin and/or carbon. The phase change material is a material which changes its aggregate state in a predefined region, in which case energy, in particular in the form of supplied heat, does not contribute to increasing the temperature of the phase change material, but rather is applied to change the aggregate state or another phase state of the phase change material, with the result that the phase change material, and therefore the latent heat store 26, initially retains its temperature, despite the supplied heat. Phase change temperatures of around 55° Celsius can be achieved by means of the paraffin, for example, which is suitable in a particularly advantageous manner for a charging operation of the motor vehicle 16. If the phase change material additionally contains carbon, its mechanical stability can be particularly advantageous, for example.

Figure 3:
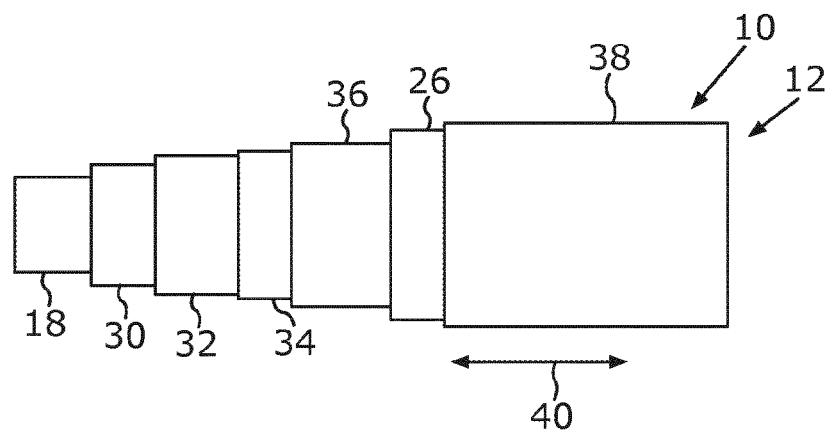
FIG. 3 is a schematic structure of the charging strand of the charging device.

In an advantageous manner, the latent heat store is arranged at least on a contact element 28 of the connection element 20. In this case, if the connection element 20 is in the form of a charging plug for example, as can be seen in FIG. 3, the contact element 28 may be a contact pin. In this case, it is also appropriate, for example, to design the charging plug to be compatible with type 2 plugs. In this case, if the connection element 20 is in the form of a charging socket, the corresponding connection element 22 may be in the form of a plug or vice versa.

Figure 2:
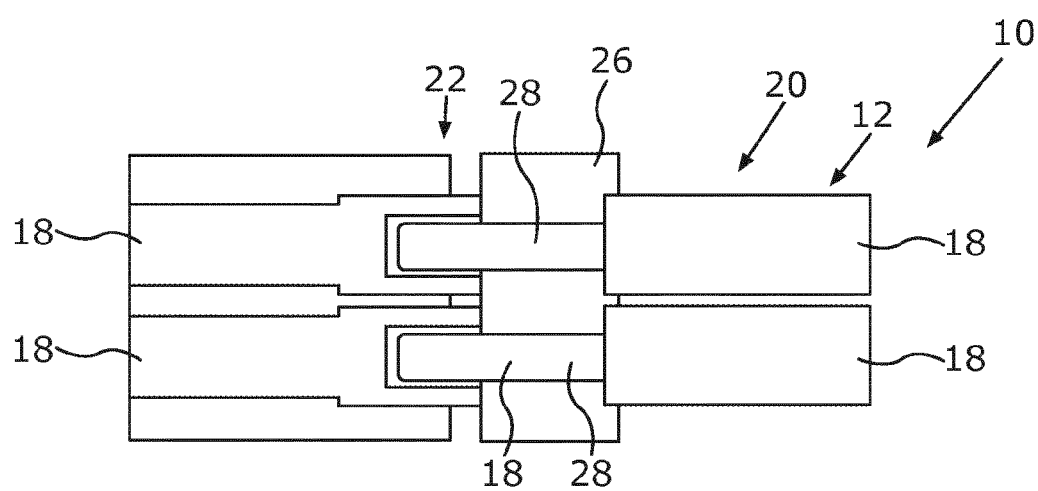
FIG. 2 is a schematic structure of the connection element of the charging device in form of a charging plug.

FIG. 2 shows an embodiment of the charging device 10 in which the connection element 20 is in the form of a charging plug, on which the latent heat store 26 is arranged.

FIG. 3 shows the charging strand 12 of the charging device 10 which is substantially in the form of a cable, with the result that the line 18 forms, in particular, a copper core of the cable-like charging strand. As a result, the charging current can be conducted in a particularly advantageous manner. The line 18 is surrounded by insulation 30 which, in the exemplary embodiment, may in turn be surrounded by a filling material 32 and a shielding braid 34, which is finally followed by external insulation 36. In this respect, the charging strand 12 shown may be in the form of a conventional cable which can be subsequently provided with the latent heat store 26 and additional further external insulation 38 by means of a retrofitting solution, for example. This makes it possible to produce the charging strand 12 in a particularly advantageous manner, in particular in a cost-effective manner, for example. Both the insulation 30 and the external insulation 36 as well as the further external insulation 38 are each advantageously formed from silicone rubber which can ensure particularly good electrical insulating properties with simultaneous flexibility of the charging strand 12.

The charging strand shown in FIG. 3 is therefore constructed in such a manner that the line 18 is at least partially surrounded by insulation 30, on the side of which facing away from the line 18 the latent heat store 26 is arranged in at least one section. In this case, the section of the line 18 is designed in such a manner that it surrounds the line 18, in particular the circular line 18, on the outer circumference side in at least one direction, that is to say the section is formed in an annular or tubular manner around the line, in which case it is formed in an annular or rod-shaped manner depending on its extent along the direction of longitudinal extent 40 of the charging strand 12. Alternatively, the section may be formed in neither a tubular nor an annular manner, but rather may be formed helically around the line 18.

Figure 4:
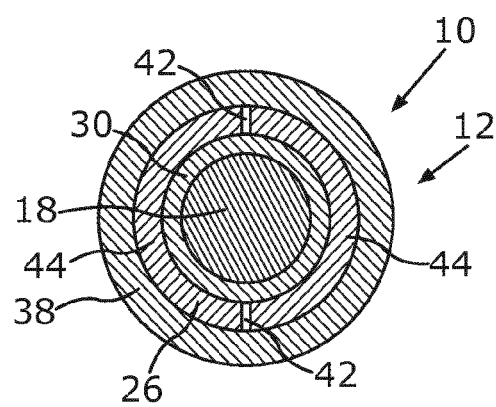
FIG. 4 is a cross section of a further embodiment of the charging strand of the charging device.

FIG. 4 shows the cross section of the charging strand 12 in a further embodiment, in which case it can be seen here that the section which forms the latent heat store 26 is formed in an annular manner around the line 18, wherein this section can be interrupted by separating walls 42, with the result that individual chambers 44 of the latent heat store 26 are formed, for example. The latter can be formed in a particularly mechanically stable manner, for example.

In this case, the charging strand 12 with its line designed as an actual current conductor made of copper is provided with the in particular liquid-tight insulation 30, in particular made of rubber or silicone rubber. This is surrounded by a phase change material which substantially forms the latent heat store 26, wherein, depending on the charging concept or the size or capacity of the electrical energy store 14 of the motor vehicle 16 to be filled, its thickness or volume can vary. For example, if the charging speed is intended to be particularly high on account of a particularly large capacity of the electrical energy store 14, the volume and the heat-absorbing capacity of the latent heat store 26 can be selected accordingly.

Finally, the latent heat store 26 is surrounded by further insulation of the external insulation 38. An advantage of the latent heat store 26 arranged in this manner is a particularly compact design and a simple structure.

As already mentioned, as a result of the sheathing with the latent heat store 26, the possibility of producing the charging strand 12 for the charging device 10 in a particularly simple manner is provided for already existing cables. The latent heat store 26 can also be arranged, in particular on the connection elements 20, in such a manner that the corresponding connection element 20 can be used further for an existing charging infrastructure for example, in a particularly advantageous manner, as a result of which acquisition costs of the charging device 10 can be particularly low, for example.

Overall, the charging device 10 shown provides the advantage that the charging time can be kept particularly short on account of the delay in reaching a limit temperature of the connection element 20, for example. Furthermore, particularly fast charging concepts can be implemented by means of the charging device 10. In addition, parts of an already existing charging infrastructure can be used further since no or only minor changes need to be made to respective basic components, such as the corresponding connection element 22, for example.

LIST OF REFERENCE SIGNS

10 Charging device
12 Charging strand
14 Electrical energy store
16 Motor vehicle
18 Line
20 Connection element
22 Corresponding connection element
24 Charging station
26 Latent heat store
28 Contact element
30 Insulation
32 Filling material
34 Shielding braid
36 External insulation
38 Further external insulation
40 Direction of longitudinal extent
42 Separating wall
44 Chamber

What is claimed is:

1. A charging device for connecting an electrical energy store of a motor vehicle to a charging station for electrical energy, comprising:
    a charging strand with at least one line for conducting a charging current;
    at least one connection element which is used to connect the charging strand to a corresponding connection element between the energy store and the charging station; and
    at least one latent heat store arranged on the charging strand and/or on the at least one connection element, wherein
    the at least one latent heat store is configured to absorb heat generated during a charging operation,
    the at least one line is at least partially surrounded by insulation,
    the at least one latent heat store is arranged in one section on a side of the insulation which faces away from the at least one line, and
    the section runs helically around the at least one line.

2. The charging device according to claim 1, wherein
    the charging strand and the connection element are components of the motor vehicle.

3. The charging device according to claim 1, wherein
    the charging strand and the connection element are components of the charging station.

4. The charging device according to claim 1, wherein
    the section surrounds the line on an outer circumference side in at least one direction and extends along the direction of longitudinal extent of the charging strand.

5. The charging device according to claim 4, wherein the section is interrupted by at least one separating wall.

6. The charging device according to claim 1, wherein the section is interrupted by at least one separating wall.

7. The charging device according to claim 1, wherein the connection element is a charging socket or a charging plug.

8. The charging device according to claim 1, wherein the latent heat store is arranged on at least one contact element of the connection element.

9. The charging device according to claim 1, wherein the latent heat store includes at least one phase change material, and the at least one phase change material includes paraffin and/or carbon.

* * * * *